US010348792B2

(12) United States Patent
Zuckerberg et al.

(10) Patent No.: US 10,348,792 B2
(45) Date of Patent: *Jul. 9, 2019

(54) DYNAMICALLY UPDATING MEDIA CONTENT FOR DISPLAY TO A USER OF A SOCIAL NETWORK ENVIRONMENT BASED ON USER INTERACTIONS (71) Applicant: Facebook, Inc., Menlo Park, CA (US)

(72) Inventors: Mark E. Zuckerberg, Palo Alto, CA (US); Andrew G. Bosworth, Palo Alto, CA (US); Chris Cox, San Francisco, CA (US); Ruchi Sanghvi, San Francisco, CA (US); Matthew Cahill, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/204,354

(22) Filed: Jul. 7, 2016

(65) Prior Publication Data
US 2016/0323339 A1    Nov. 3, 2016

Related U.S. Application Data (63) Continuation of application No. 13/846,876, filed on Mar. 18, 2013, which is a continuation of application
(Continued)

(51) Int. Cl.
H04L 29/06       (2006.01)
G06Q 30/02       (2012.01)
(Continued)

(52) U.S. Cl.
CPC ........... H04L 65/601 (2013.01); G06Q 30/02 (2013.01); H04L 65/40 (2013.01); H04L 67/02 (2013.01);
(Continued)

(58) Field of Classification Search
CPC .......... G06F 17/30867; G06F 17/3053; G06F 17/30699; G06F 17/30705; G06F 17/3089;
(Continued)

(56) References Cited

U.S. PATENT DOCUMENTS 5,937,413 A    8/1999  Hyun et al.
6,029,141 A    2/2000  Bezos et al.
(Continued)

FOREIGN PATENT DOCUMENTS

JP    2002-245212    8/2002
JP    2002-297570   10/2002
(Continued)

OTHER PUBLICATIONS

Australian Patent Office, Examiner's First Report, Patent Application No. 2007-284811, dated May 25, 2011, two pages.
(Continued)

Primary Examiner — Sherrod L Keaton
(74) Attorney, Agent, or Firm — Fenwick & West LLP (57) ABSTRACT A system and method provides dynamically selected media content to someone using an electronic device in a social network environment. Items of media content are selected for the user based on his or her relationships with one or more other users. The user's relationships with other users are reflected in the selected media content and its format. An order is assigned to the items of media content, for example, based on their anticipated importance to the user, and the items of media content are displayed to the user in the assigned order. The user may change the order of the items of media content. The user's interactions with media content available in the social network environment are monitored, and those interactions are used to select additional items of media content for the user.

20 Claims, 5 Drawing Sheets

Related U.S. Application Data

No. 13/615,253, filed on Sep. 13, 2012, now Pat. No. 8,412,821, which is a continuation of application No. 13/448,157, filed on Apr. 16, 2012, now Pat. No. 8,312,140, which is a continuation of application No. 11/503,037, filed on Aug. 11, 2006, now Pat. No. 8,171,128.

(51) Int. Cl.
 H04L 29/08 (2006.01)
 G06F 16/335 (2019.01)
 G06F 16/9535 (2019.01)

(52) U.S. Cl.
 CPC ............ *H04L 67/22* (2013.01); *H04L 67/306* (2013.01); *G06F 16/335* (2019.01); *G06F 16/9535* (2019.01)

(58) Field of Classification Search
 CPC ... G06F 16/9535; G06F 16/335; H04L 65/40; H04L 65/601
 See application file for complete search history.

(56) References Cited

U.S. PATENT DOCUMENTS

| | | | |
|---|---|---|---|
| 6,029,195 A | 2/2000 | Herz | |
| 6,266,649 B1* | 7/2001 | Linden | G06Q 10/08345 705/14.51 |
| 6,513,069 B1 | 1/2003 | Abato et al. | |
| 6,816,850 B2 | 11/2004 | Culliss | |
| 7,013,292 B1 | 3/2006 | Hsu et al. | |
| 7,249,123 B2 | 7/2007 | Elder et al. | |
| 7,269,590 B2 | 9/2007 | Hull et al. | |
| 7,496,603 B2 | 2/2009 | Deguchi et al. | |
| 7,599,935 B2 | 10/2009 | La Rotonda et al. | |
| 7,610,287 B1 | 10/2009 | Dean et al. | |
| 7,664,735 B2 | 2/2010 | Zhang et al. | |
| 7,669,123 B2 | 2/2010 | Zuckerberg et al. | |
| 7,725,492 B2 | 5/2010 | Sittig et al. | |
| 7,734,632 B2* | 6/2010 | Wang | G06Q 30/02 707/749 |
| 7,792,815 B2 | 9/2010 | Aravamudan et al. | |
| 7,797,256 B2 | 9/2010 | Zuckerberg et al. | |
| 7,809,709 B1 | 10/2010 | Harrison | |
| 7,809,805 B2 | 10/2010 | Stremel et al. | |
| 7,810,037 B1 | 10/2010 | Edwards et al. | |
| 7,818,392 B1* | 10/2010 | Martino | G06Q 10/10 709/217 |
| 7,827,208 B2 | 11/2010 | Bosworth et al. | |
| 7,827,265 B2 | 11/2010 | Cheever et al. | |
| 7,890,871 B2 | 2/2011 | Etkin | |
| 7,933,810 B2 | 4/2011 | Morgenstern | |
| 7,945,653 B2 | 5/2011 | Zuckerberg et al. | |
| 7,970,657 B2 | 6/2011 | Morgenstern | |
| 7,991,764 B2 | 8/2011 | Rathod | |
| 8,027,943 B2 | 9/2011 | Juan et al. | |
| 8,136,145 B2 | 3/2012 | Fetterman et al. | |
| 8,204,952 B2 | 6/2012 | Stremel et al. | |
| 8,225,376 B2 | 7/2012 | Zuckerberg et al. | |
| 8,229,951 B2 | 7/2012 | Nickell et al. | |
| 8,249,943 B2 | 8/2012 | Zuckerberg et al. | |
| 8,296,373 B2 | 10/2012 | Bosworth et al. | |
| 8,402,094 B2 | 3/2013 | Bosworth et al. | |
| 8,521,787 B2 | 8/2013 | Bosworth et al. | |
| 8,549,651 B2 | 10/2013 | Callahan et al. | |
| 8,627,506 B2 | 1/2014 | Vera et al. | |
| 8,732,846 B2 | 5/2014 | D'Angelo et al. | |
| 8,832,556 B2 | 9/2014 | Steinberg | |
| 8,887,066 B1 | 11/2014 | Deng et al. | |
| 9,065,791 B2 | 6/2015 | Bosworth et al. | |
| 9,128,800 B2 | 9/2015 | D'Angelo et al. | |
| 9,183,599 B2 | 11/2015 | Zuckerberg et al. | |
| 2001/0037721 A1 | 11/2001 | Hasegawa et al. | |
| 2002/0059201 A1 | 5/2002 | Work | |
| 2003/0145093 A1 | 7/2003 | Oren et al. | |
| 2003/0222918 A1 | 12/2003 | Coulthard | |
| 2003/0225632 A1 | 12/2003 | Tong et al. | |
| 2004/0024846 A1 | 2/2004 | Randall et al. | |
| 2004/0088177 A1 | 5/2004 | Travis et al. | |
| 2004/0148275 A1 | 7/2004 | Achlioptas | |
| 2004/0172405 A1 | 9/2004 | Farran | |
| 2005/0021750 A1 | 1/2005 | Abrams | |
| 2005/0114759 A1 | 5/2005 | Williams et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171955 A1 | 8/2005 | Hull et al. | |
| 2005/0177385 A1 | 8/2005 | Hull et al. | |
| 2005/0197846 A1 | 9/2005 | Pezaris et al. | |
| 2005/0198020 A1 | 9/2005 | Garland et al. | |
| 2005/0198031 A1 | 9/2005 | Pezaris et al. | |
| 2005/0198305 A1 | 9/2005 | Pezaris et al. | |
| 2005/0203807 A1 | 9/2005 | Bezos et al. | |
| 2005/0216300 A1 | 9/2005 | Appelman et al. | |
| 2005/0216550 A1 | 9/2005 | Paseman et al. | |
| 2005/0235062 A1 | 10/2005 | Lunt et al. | |
| 2005/0246328 A1 | 11/2005 | Zhang et al. | |
| 2005/0256756 A1 | 11/2005 | Lam et al. | |
| 2006/0026147 A1 | 2/2006 | Cone et al. | |
| 2006/0041543 A1 | 2/2006 | Achlioptas | |
| 2006/0042483 A1 | 3/2006 | Work et al. | |
| 2006/0048059 A1 | 3/2006 | Etkin | |
| 2006/0052091 A1 | 3/2006 | Onyon et al. | |
| 2006/0080613 A1 | 4/2006 | Savant | |
| 2006/0085419 A1 | 4/2006 | Rosen | |
| 2006/0136419 A1 | 6/2006 | Brydon et al. | |
| 2006/0143067 A1* | 6/2006 | Calabria | G06Q 10/10 705/26.1 |
| 2006/0143183 A1 | 6/2006 | Goldberg et al. | |
| 2006/0161599 A1 | 7/2006 | Rosen | |
| 2006/0184617 A1 | 8/2006 | Nicholas et al. | |
| 2006/0190281 A1 | 8/2006 | Kott et al. | |
| 2006/0194186 A1 | 8/2006 | Nanda | |
| 2006/0200434 A1 | 9/2006 | Flinn et al. | |
| 2006/0218153 A1 | 9/2006 | Voon et al. | |
| 2006/0218225 A1 | 9/2006 | Hee Voon et al. | |
| 2006/0229063 A1 | 10/2006 | Koch | |
| 2006/0230061 A1 | 10/2006 | Sample et al. | |
| 2006/0242139 A1 | 10/2006 | Butterfield et al. | |
| 2006/0242178 A1 | 10/2006 | Butterfield et al. | |
| 2006/0242581 A1 | 10/2006 | Manion et al. | |
| 2006/0247940 A1 | 11/2006 | Zhu et al. | |
| 2006/0248573 A1 | 11/2006 | Pannu et al. | |
| 2006/0256008 A1 | 11/2006 | Rosenberg | |
| 2006/0265227 A1 | 11/2006 | Sadamura et al. | |
| 2006/0265277 A1 | 11/2006 | Yasinovsky et al. | |
| 2006/0271569 A1 | 11/2006 | Fong et al. | |
| 2006/0282426 A1 | 12/2006 | Spears | |
| 2006/0293976 A1 | 12/2006 | Nam | |
| 2006/0294085 A1 | 12/2006 | Rose et al. | |
| 2007/0050360 A1 | 3/2007 | Hull et al. | |
| 2007/0162458 A1 | 7/2007 | Fasciano | |
| 2007/0174389 A1 | 7/2007 | Armstrong et al. | |
| 2007/0208916 A1 | 9/2007 | Tomita | |
| 2007/0226314 A1 | 9/2007 | Eick et al. | |
| 2007/0250511 A1 | 10/2007 | Endler et al. | |
| 2007/0255831 A1 | 11/2007 | Hayashi et al. | |
| 2007/0261071 A1 | 11/2007 | Lunt et al. | |
| 2007/0266097 A1 | 11/2007 | Harik et al. | |
| 2007/0282987 A1 | 12/2007 | Fischer et al. | |
| 2008/0005072 A1 | 1/2008 | Meek et al. | |
| 2008/0005076 A1 | 1/2008 | Payne et al. | |
| 2008/0010343 A1 | 1/2008 | Escaffi et al. | |
| 2008/0033776 A1 | 2/2008 | Marchese | |
| 2008/0040428 A1 | 2/2008 | Wei et al. | |
| 2008/0070697 A1 | 3/2008 | Robinson et al. | |
| 2008/0086458 A1 | 4/2008 | Robinson et al. | |
| 2008/0189292 A1 | 8/2008 | Stremel et al. | |
| 2008/0288612 A1 | 11/2008 | Kwon | |
| 2009/0048922 A1 | 2/2009 | Morgenstern et al. | |
| 2009/0049070 A1 | 2/2009 | Steinberg | |
| 2009/0049127 A1 | 2/2009 | Juan et al. | |
| 2009/0171950 A1 | 7/2009 | Lunenfeld | |

(56) References Cited

U.S. PATENT DOCUMENTS

| | | | |
|---|---|---|---|
| 2010/0057555 | A1 | 3/2010 | Butterfield et al. |
| 2011/0040751 | A1 | 2/2011 | Chandrasekar et al. |
| 2013/0041921 | A1* | 2/2013 | Cooper ............... G06F 17/2735 707/780 |
| 2013/0066852 | A1 | 3/2013 | Rose |

FOREIGN PATENT DOCUMENTS

| | | |
|---|---|---|
| JP | 2002-312559 | 10/2002 |
| JP | 2004-139529 | 5/2004 |
| JP | 2008-517402 | 5/2008 |
| WO | WO 2005/089291 | 9/2005 |
| WO | WO 2006/019752 | 2/2006 |
| WO | WO 2006/044939 | 4/2006 |
| WO | WO 2007/052285 | 5/2007 |

OTHER PUBLICATIONS

Australian Patent Office, Examiner's First Report, Patent Application No. 2007-284813, dated Jun. 30, 2011, two pages.
Canadian Intellectual Property Office, Office Action, Canadian Patent Application No. 2,660,459, dated May 22, 2013, two pages.
Canadian Intellectual Property Office, Office Action, Canadian Patent Application No. 2,660,680, dated Feb. 10, 2015, three pages.
Canadian Intellectual Property Office, Office Action, Canadian Patent Application No. 2,660,680, dated Oct. 16, 2013, four pages.
Canadian Intellectual Property Office, Requisition by the Examiner, Canadian Patent Applciation No. 2,660,459, dated Jul. 27, 2012, 6 pages.
Canadian Intellectual Property Office, Requisition by the Examiner, Canadian Patent Application No. 2,660,680, dated Jan. 26, 2012, 3 Pages.
China State Intellectual Property Office First Office Action, Application No. 2007-800340213, dated Feb. 12, 2010, six pages.
China State Intellectual Property Office, Decision of Rejection, Chinese Application No. 2007-80034021.3, dated Mar. 29, 2012, 9 pages.
China State Intellectual Property Office, Second Office Action, Chinese Patent Application No. 2007-80034021.3, dated Oct. 28, 2011, seven pages.
Chipin. Chipin: The easy way to collect money [online], Dec. 15, 2006 http://web.archive.org/web/20061215090739/www.chipin.com/overview.
European Patent Office Examination Report, European Patent Application No. 07836589.7, dated Mar. 26, 2010, one page.
European Patent Office Extended European Search Report, European Patent Application No. 07836589.7, dated Dec. 23, 2009, four pages.
European Patent Office, Examination Report, European Patent Application No. 07836589.7, dated Aug. 30, 2013, four pages.
European Patent Office, Summons to attend oral proceedings pursuant to Rule 115(1) EPC, European Patent Application No. 07836589.7, dated Oct. 9, 2015, five pages.
Flores, Fernando et al. "Computer systems and the design of organizational interaction." In ACM Transactions on Information Systems (TOIS), vol. 6, Issue 2, Apr. 1988.
In re the Patent of Timothy A. Kendall, U.S. Appl. No. 13/342,006, filed Dec. 31, 2011, U.S. Publication No. 2012-0109757 A1, Entitled, "Sponsored Stores and News Stories Within a Newsfeed of a Social Networking System," Submission of Prior Art Under 37 CFR1.501, submitted by Yogesh C. Rathod on May 24, 2012, 129 Pages.
India Patent Office, Examination Report, India Patent Application No. 830/CHEN/2009, dated May 17, 2014, two pages.
India Patent Office, First Examination Report, dated Dec. 19, 2013, Indian Application No. 830/CHENP/2009, two pages.
Japanese Patent Office, Decision of Grant, Japanese Patent Application No. 2009-523824, dated Dec. 25, 2012, six pages.
Japanese Patent Office, Notice of Grounds for Rejection, Japanese Patent Application No. P2009-523824, dated Apr. 24, 2012, 6 pages.
Japanese Patent Office, Notice of Grounds for Rejection, Japanese Patent Application No. P2009-523825, dated May 22, 2012, 5 pages.
Parzek, E. Social Networking to Chipin to a Good Cause [online]. Business Design Studio, Jun. 29, 2006 http://www.businessdesignstudio.com/resources/blogger/2006/06social-netwo-rking-tochipin-to-good.html.
PCT International Search Report and Written Opinion, PCT Application No. PCT/US2007/017572, dated Jun. 20, 2008, eight pages.
PCT International Search Report and Written Opinion, PCT/US2007/017574, dated Jul. 14, 2008.
State Intellectual Property Office of the People's Republic of China, Third Office Action, Chinese Patent Application No. 200780034021.2, dated Jan. 13, 2014, ten pages.
Takai, K., et al., "ACS: A Social Networking System for Various Human Relations," Proceedings of the Annual Conference on JSAI (CD ROM), vol. 20, Jul. 2006, pp. 577-580 (with English abstract).
Tsuruoka, N., "Web 2.0 Practice Technique: Google, Yahoo!, Rest," WEB +DB Press, Japan, issued by Kabushikikaisha Gijutsuhyouronsha, vol. 32, First Edition, May 25, 2006, pp. 84-90.
U.S. Appl. No. 11/982,974, filed Nov. 5, 2007, Ruchi Sanghvi, Systems and Methods for a Web-Based Social Networking Environment Integrated Within One or More Computing and/or Networking Applications.
U.S. Appl. No. 60/965,624, filed Aug. 20, 2007, Adam D'Angelo, Systems and Methods for Targeting Advertisements in a Social Network Environment.
U.S. Appl. No. 60/965,852, filed Aug. 22, 2007, Adam D'Angelo, Systems and Methods for Advertising.
U.S. Appl. No. 60/966,442, filed Aug. 28, 2007, Ezra Callahan, System and Method for Incorporating an Entity or Group other than a Natural Person into a Social network.
U.S. Appl. No. 60/967,842, filed Sep. 7, 2007, Ezra Callahan, Systems and Methods for Dynamically Updating Privacy Settings.
U.S. Appl. No. 61/005,614, filed Dec. 5, 2007, Yishan Wong, Systems and Methods for Community Translations on a Web-Based Social Network.
United States Office Action, U.S. Appl. No. 13/846,876, dated Sep. 16, 2016, 18 pages.
United States Office Action, U.S. Appl. No. 13/846,876, dated Jul. 30, 2015, 17 pages.
United States Office Action, U.S. Appl. No. 11/503,037, dated Jul. 19, 2011, 15 pages.
United States Office Action, U.S. Appl. No. 11/503,037, dated Mar. 16, 2010, 13 pages.
United States Office Action, U.S. Appl. No. 11/503,037, dated Jun. 12, 2009, 15 pages.
United States Office Action, U.S. Appl. No. 11/503,037, dated Nov. 5, 2008, 8 pages.
United States Office Action, U.S. Appl. No. 11/503,037, dated May 30, 2008, 11 pages.
United States Office Action, U.S. Appl. No. 13/846,876, dated Jun. 30, 2017, seventeen pages.
United States Office Action, U.S. Appl. No. 13/846,876, dated Jun. 14, 2018, twenty pages.
United States Office Action, U.S. Appl. No. 13/846,876, dated Oct. 4, 2018, sixteen pages.
United States Office Action, U.S. Appl. No. 13/846,876, dated Mar. 7, 2019, 7 pages.

* cited by examiner

FIG. 3 home  search  browse  mobile  invite  help  logout

Welcome Matt!

Search

My Profile    edit
My Friends
My Photos
My Groups
My Events
My Messages (2)
My Account
My Privacy Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum.Stet clita kasd gubergren.

Lorem ipsum dolor sit amet, consetetur sadipscing elitr, sed diam nonumy eirmod tempor invidunt ut labore et dolore magna aliquyam erat.

402 —

Lorem ipsum dolor sit amet, consetetur sadipscing elitr, sed diam nonumy eirmod tempor invidunt ut labore etdolore magna aliquyam erat, sed diam voluptua. At veroeos et accusam et justo duo dolores et ea rebum.

Lorem ipsum dolor sit amet, consetetur sadipscing elitr, sed diam nonumy eirmod tempor invidunt ut labore etdolore magna aliquyam erat.

See All Recent Stories

You have 2 new messages.
You have 7 friend requests.

My Status    edit

Matt is zuru zuru zuru zuru.Updated last Wednesday

Upcoming Events    see all

Putnam Appreciation B(day)
Today, July 12 at 3:20pm

Birthdays    see all

Today's Birthdays
Dr Chris Putnam

July 14th Birthdays
Christina Hoisberry
Randy Sackfield
Trevor Harkema
Austin Shoemaker The Next Step    see all Post your photos on Facebook Photos. Enjoy unlimited uploads!

DYNAMICALLY UPDATING MEDIA CONTENT FOR DISPLAY TO A USER OF A SOCIAL NETWORK ENVIRONMENT BASED ON USER INTERACTIONS

CROSS-REFERENCE TO RELATED APPLICATIONS

The present application is a continuation of U.S. application Ser. No. 13/846,876, filed on Mar. 18, 2013, which is a continuation of U.S. application Ser. No. 13/615,253, filed on Sep. 13, 2012, now U.S. Pat. No. 8,412,821, which is a continuation of U.S. application Ser. No. 13/448,157, filed on Apr. 16, 2012, now U.S. Pat. No. 8,312,140, which is a continuation of U.S. application Ser. No. 11/503,037, filed on Aug. 11, 2006, now U.S. Pat. No. 8,171,128, each of which is hereby incorporated by reference in its entirety.

The present application also incorporates by reference the following applications in their entirety: U.S. Application No. 60/750,844, filed on Dec. 14, 2005; U.S. Application No. 60/753,810, filed on Dec. 23, 2005; U.S. application Ser. No. 11/493,291, filed on Jul. 25, 2006; U.S. patent application Ser. No. 11/502,757 filed on Aug. 11, 2006; U.S. patent application Ser. No. 11/503,093, filed on Aug. 11, 2006; and U.S. patent application Ser. No. 11/503,242, filed on Aug. 11, 2006.

BACKGROUND

The present invention relates generally to media presentation, and more particularly to systems and methods for presenting dynamically selected media content to a user of an electronic device in a social network environment.

Conventionally, users of networking websites connect with other users and provide information about themselves. For example, a user may post contact information, background information, current job position, hobbies, and so forth. Other users may contact the posting user based on common interests, or for any other reason.

Recently, social networking websites have developed systems for tailoring connections between various users. For example, users may be grouped based on geographical location, job type, and so forth. Social networking offers users the opportunity for frequent, automatic notification of changes in the information posted by other users.

There are existing mechanisms that allow a user to display information about other users. Some mechanisms may allow the user to select particular items of media content for immediate viewing. Typically, however, these items of media content are disparate and disorganized. In other words, the user must spend time researching a topic by searching for, identifying, and reading individual items of media content that are not presented in a coherent, consolidated manner. Further, often the user remains unaware of the existence of some items of media content that were not captured in the user's research. For example, in a typical social networking environment, one would have to look up another user and click on various links to find information about the other user.

In addition, there are news feeds to which one can subscribe that can provide information on a particular topic via automatic download to an electronic device associated with a user. However, the downloaded information is not selected and presented based on the user's relationships with other users, and does not occur within the context of a social network. What is desired is a way for a user of a social network automatically to receive items of media content that are dynamically selected and presented to the user based on his relationships with other users.

SUMMARY

The present invention provides a system and method for providing dynamically selected media content to a user of an electronic device in a social network environment. Items of media content are selected for the user based on his or her relationships with one or more other users. The user's relationships with other users are reflected in the selected media content and its format. An order may be assigned to the selected items of media content, for example, based on their importance to the user, and the items of media content displayed to the user in that order. The user may change the order of the items of media content. The user's interactions with the items of media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user. The results of this analysis are used to select, consolidate and tailor content for news stories to be presented to the user in a personalized, dynamic news feed that may be more interesting or desirable to the user because of its selection based upon the user's personal relationships.

DETAILED DESCRIPTION

A system and method is provided for presenting dynamically selected media content to a user of an electronic device in a social network environment. Items of media content are selected for the user based on his or her relationships with one or more other users, with whom the user is associated through a social network provider. The user's relationships with other users are reflected in the selected media content and its format. For example, media content concerning the user's brother, wife, or best friend from college may be presented to the user as being about "your brother," "your wife" and "your best friend from college," respectively. Accordingly, the media content dynamically selected for and presented to the user is personalized in a way that would be less meaningful or interesting if viewed by someone other than the user.

An order is assigned to the selected media content, for example, based on its importance to the user, and the media content is displayed to the user in the assigned order. The user may change the order of the items of media content, for example, via a separate settings display that allows the user to prioritize and/or filter certain items of media content, and/or also by using a "drag-and-drop" function to organize stories dynamically on the media content display. The user's interactions with the media content and other items provided by the social network provider are monitored, and those interactions are used to select additional items of media content for the user. In a method according to one embodiment of the invention, the frequency of user interaction with other users and objects on the network is analyzed to identify events, relationships, news items and other objects of interest to the user, and to rank them in importance to the user as reflected in the descending order of the frequency of the user's interaction with other users. In a display according to such an embodiment, the results of this analysis are used to select, consolidate and tailor content for news stories to be presented to the user in a personalized, dynamic news feed that is more meaningful to the user because of its basis in the user's personal relationships.

Figure 1:
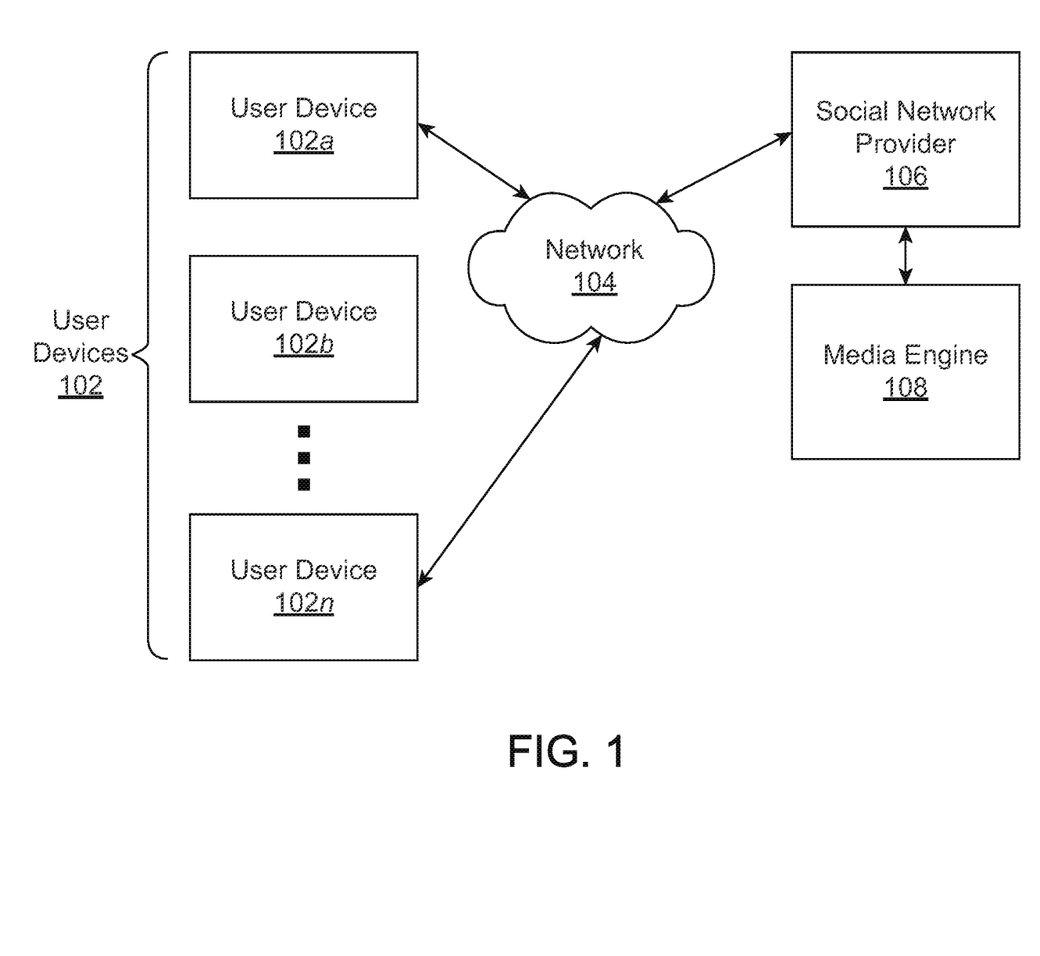
FIG. 1 is a diagram of an exemplary architecture for providing dynamically selected media to a user of an electronic device in a social network environment.

FIG. 1 is a diagram of an exemplary architecture for presenting dynamically selected media to a user of an electronic device in a social network environment. User devices 102, such as a user device 102a, a user device 102b, and a user device 102n, communicate over a network 104 with a social network provider 106. The user devices 102a-102n may comprise any device associated with one or more users, such as a cellular telephone, a personal digital assistant, a desktop or a laptop computer, and so forth. Any types of user devices 102 are within the scope of various embodiments.

The social network provider 106 may comprise any user or entity that provides social networking services, communication services, dating services, and so forth. For example, the social network provider 106 may host a website that allows one or more users at the user devices 102 to communicate with one another via the website. In one instance, the user associated with the user device 102a may communicate with the user associated with the user device 102b via a social networking website associated with the social network provider 106 that offers the user an opportunity to connect or reconnect with one or more other users that attended, for example, the same university as the user.

A media engine 108 is coupled to the social network provider 106. In one embodiment, the media engine 108 can select items of media content based on the user's relationships with other users through the social network provider 106. The media engine 108 analyzes the frequency of the user's interactions with other users through the social network provider 106 and with the selected items of media. The results of this analysis are used to rank the importance of the other users to the user, so that new items of media content are selected and displayed to the user in the order of the content's anticipated importance or interest to the user.

For example, a user at the user device 102a uses a cursor to click on items of media content related to his sister Abby very frequently, and to click on emails from his friend Bob somewhat less frequently. The items of media content selected by the media engine 108 will be dynamically presented to the user at the user device 102a with an importance ranking based on an analysis of the frequencies of the user's interactions with items of media content associated with his friends, so that items of media content associated with Abby will be presented first to the user at the user device 102a, followed by items of media content associated with Bob. For example, the items of media content may be news stories about the other users Abby and Bob. Such news stories would be presented to the user as stories about "your sister" and "your best friend," so that the wording and content of the stories would not be meaningful to someone other than the users.

In an embodiment not shown, the media engine 108 can receive media content preference settings selections from the users at the user devices 102. The media engine 108 can save the media content preference settings to a profile associated with each user. Once the media content preference settings are selected by the user, the media engine 108 can use the media content preference settings to insure that items of media content concerning particular relationships between the user and other users are not displayed to the user.

The users at the user devices 102 can group other users, events or objects according to categories, such as "friends", "school", "geography", "business", and so forth, and select a media content preference setting applicable to an entire category; any type of grouping may be employed by the user and/or the social network provider 106. Further, according to some embodiments, the user may make media content preference settings applicable to individual other users, events or objects. For instance, the user may select media content preference settings for Jane, media content preference settings for John, and/or media content preference settings for groups of users, which may or may not include Jane and John.

Figure 2:
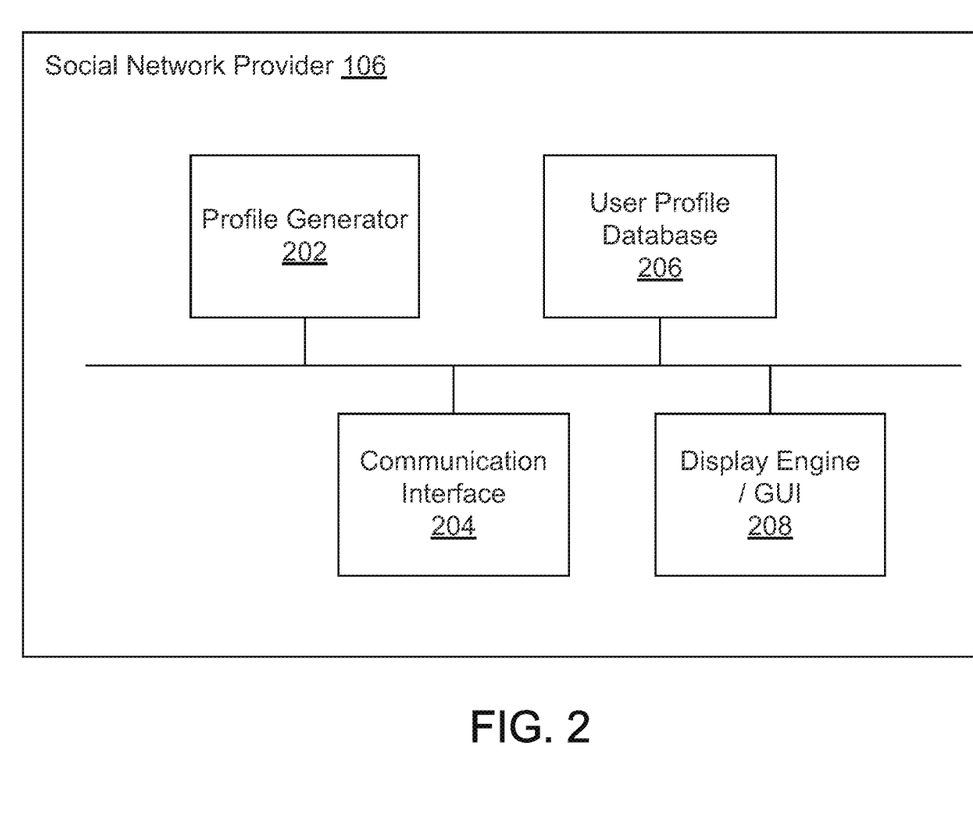
FIG. 2 is a block diagram of an exemplary social network provider.

Referring now to FIG. 2, a block diagram of an exemplary system for providing a social network 106 is illustrated. The social network provider 106 may comprise a server, a client device, or any other device.

The social network provider 106 includes a profile generator 202 for creating the profile for the user, as discussed herein. For example, the user may provide contact information, friends, photos, and so forth to associate with the profile for the user. The profile generator 202 utilizes the information provided by the user to create the profile (i.e., the user profile). As discussed herein, the profile may include one or more categories or subcategories and news priority settings selections may be provided for each of the one or more categories or subcategories.

The social network provider 106 includes a communications interface 204 for communicating with the user devices 102, such as the user devices 102a-102n described herein, over the network 104. The user devices 102 communicate various types of information, such as media content preference settings selections, groupings of other users, and so forth to the social network provider 106 via the communications interface 204. Any type of communications interface 204 is within the scope of various embodiments.

A user profile database 206 is provided for storing data associated with each of the users, such as the users associated with the user devices 102a-102n, in the user profiles created by the profile generator 202. When the users at the user devices 102 select media content preference settings to associate with their user profiles, the user profile database 206 updates the user data associated with each user profile. Accordingly, the media content preference settings selections are stored in association with each user profile. The user profiles and/or the media content preference settings selections may be stored, modified, added, and so forth to any storage medium, according to some embodiments.

A display engine/GUI 208 may also be provided by the social network provider 106. The display engine/GUI 208 displays dynamically selected items of media, the user's profile, and so forth to a user of an electronic device in a social network environment to the users associated with the user devices 102. The users can interact with the social network provider 106 via the display engine/GUI 208. For example, the users can access the dynamically selected items of media, their own user profile, other items of media content available via the social network provider, select media content preference settings, and so forth via the display engine/GUI 208.

Although the social network provider 106 is described as being comprised of various components (the profile generator 202, the communications interface 204, the user profile database 206, and the display engine/GUI 208), fewer or more components may comprise the social network provider 106 and still fall within the scope of various embodiments.

Figure 3:
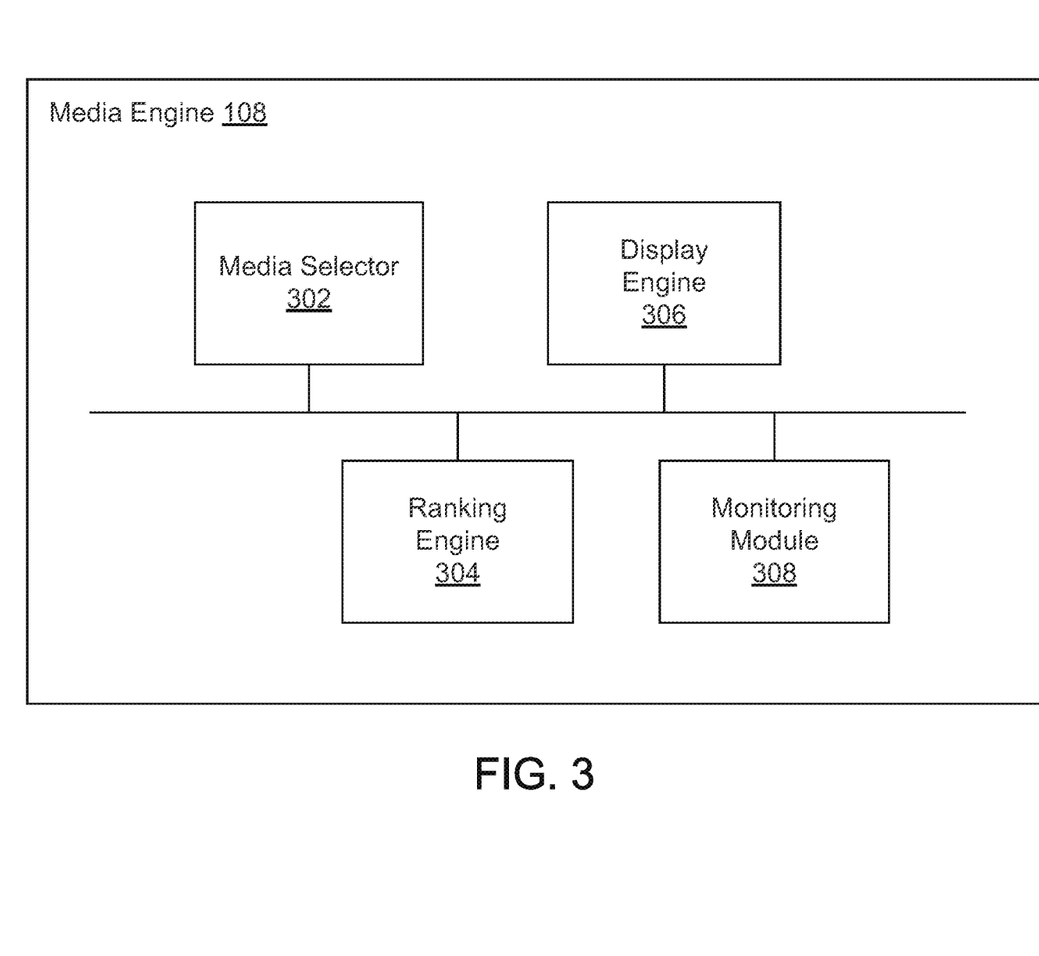
FIG. 3 is a block diagram of an exemplary media engine.

FIG. 3 is a block diagram of an exemplary media engine 108. A media selector 302 gathers items of media content available through the social network provider, consolidates them and prepares them for presentation to the user. For example, the media selector 302 finds four items of media content associated with Abby and six items of media content associated with Bob, arranges them in the order provided by the ranking engine 304, formats them in language intelligible only to the user as discussed above, and presents them to the user via the display engine 306.

For example, in some embodiments the media selector 302 can identify items of media content associated with relationships, events or objects that receive high rankings from the ranking engine 304, locate information related to the items of media content associated with the 20 relationships, events or objects of greatest interest to the user, and consolidate that information into content for personalized, dynamic presentation on those 20 topics.

A ranking engine 304 analyzes the frequency of user actions associated with particular relationships, events and objects, or categories or subcategories of relationships, events or objects made available via the social network provider 106. According to some embodiments, the ranking engine 304 comprises a database or other storage medium that stores user interaction data. Alternatively, the monitoring module 308 comprises a database or other storage medium that stores user interaction data. The ranking engine 304 examines the user interaction data, uses an algorithm to weight the items of media content associated with relationships, events and objects, individually and/or in categories relative to the frequency of user interaction with these items of media. The ranking engine 304 orders the items of media content based on the measured frequencies of user interaction, generating a list of the items of media content reflecting their importance to the user. For example, the items of media content may be arranged in descending order of their importance to the user, in that a highest frequency of user interactions with items of media content associated with a particular relationship results in items of media content pertaining to that relationship being listed first. Alternatively, any algorithm could be used by the ranking engine, to generate other orders for the items of media content on other bases. In some embodiments, the order generated for the items of media content is based on the user affinity described in U.S. application Ser. No. 11/503,093, cited above.

Because user interest may vary over short and long timescales, the weighting may change as a function of time in some embodiments. For example, a user planning a trip may be very interested in news of other users who have traveled recently, in news of trips identified as events by other users, and in travel information, and then be much less interested in these relationships, events, objects, or categories or subcategories thereof upon his return. Thus, items of media content associated with another user who has traveled recently may receive a large weighting relative to other items of media, and the weighting will decay steeply so that the weighting is low by the time of the user's return. Alternatively, the weighting associated with individual relationships, events and objects, or categories or subcategories thereof that are of long-term interest may remain steadily high.

A display engine 306 receives the consolidated, ordered items of media content from the media selector 302 and creates a presentation of personalized, dynamically selected media that may be most meaningful to the user because of its basis in the user's personal relationships. For example, the display engine 306 may personalize a media item topic heading to information about a particular relationship, such as that between the user and his brother, and modify the content of the media item so that it is about "your brother." Any number of such translations may be used to tailor the display to the user based on his relationships with other users. In some embodiments, the presentation of personalized, dynamically selected media that may be most meaningful to the user because of its basis in the user's personal relationships may be formatted by the media selector 302, and forwarded with modifications completed to the display engine 306.

According to some embodiments, the display engine 306 comprises a database or other storage medium that stores translation data, which the display engine 306 accesses in order to create a personalized, dynamic news feed, which immediately informs the user of any new items of media content introduced to the social network environment that may be of interest to the user. The display engine 306 may then forward the news feed to the display engine/GUI 208 for display to the user associated with the particular news feed display. The immediately updated display is discussed in further detail in association with FIG. 4. In some embodiments, the media selector 302 comprises the database or other storage medium that stores translation data. In some embodiments, the display engine/GUI 208 may be identical with the display engine 306.

A monitoring module 308 tracks user interactions with items of media content made available via the social network provider 106 to determine which relationships, events and objects are most interesting to the user by measuring the frequency of the user's interactions with the items of media content available through the social network provider. The frequency of user actions associated with particular relationships, events and objects, or categories or subcategories of relationships, events or objects is recorded. According to some embodiments, the monitoring module 308 comprises a database or other storage medium that stores interaction data, which the ranking engine 304 accesses so that the ranking engine 304 can order the items of media content based on the measured frequencies of user interaction, generating a list of the items of media content reflecting their importance to the user. For example, the monitoring module can count the number of times the user accesses email from his brother, or the number of times the user clicked on dynamically selected items of media content reflecting news about his best friend.

Figure 4:
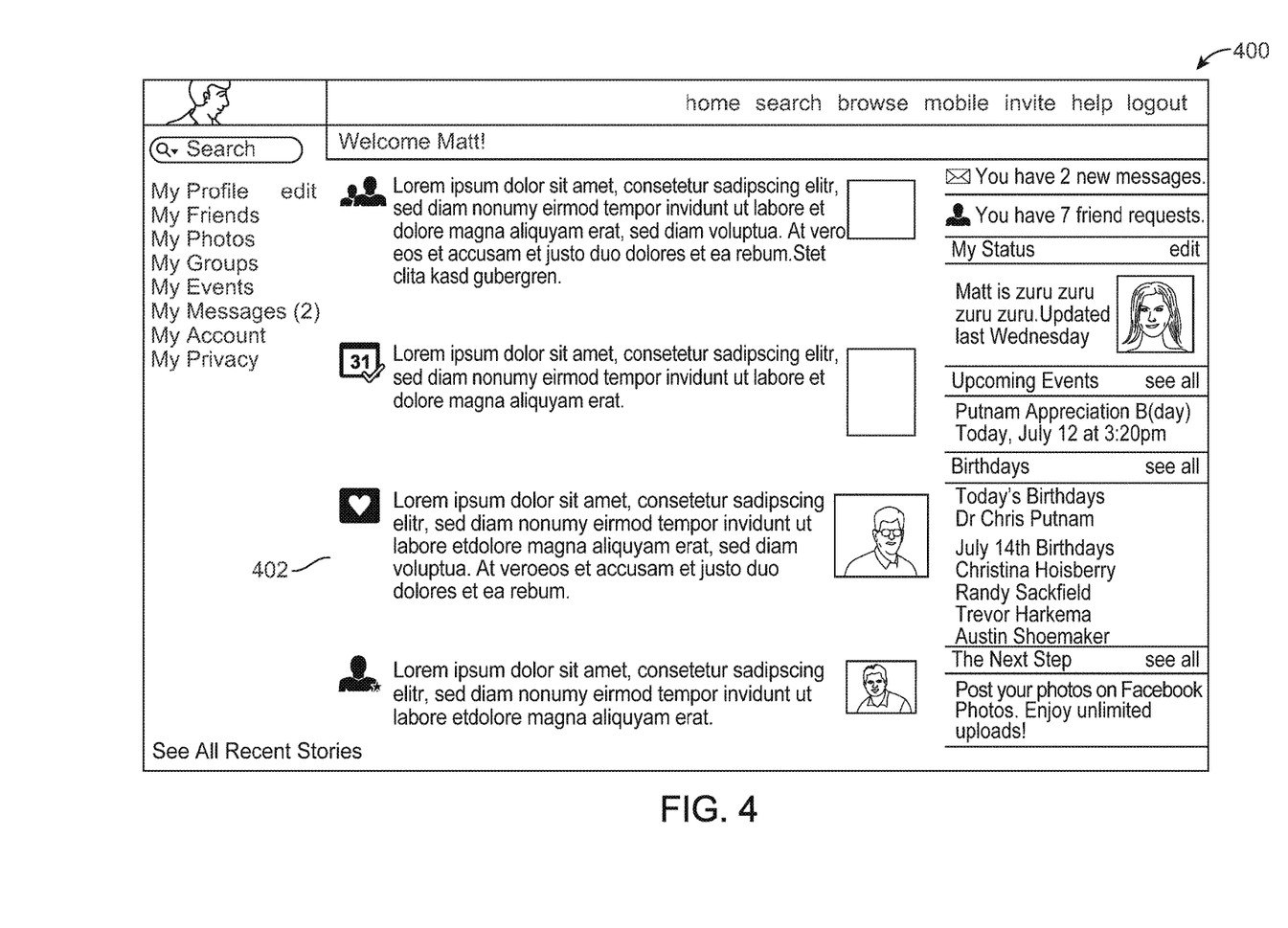
FIG. 4 is an exemplary media display screen, such as might be displayed to a user in a social network environment.

FIG. 4 shows an exemplary presentation screen 400 of dynamically selected media content to a user of an electronic device in a social network environment. As discussed herein, the presentation 400 of personalized, dynamically selected media content utilizes the user action analysis generated by the ranking engine 304 to present news gathered by the media selector 302 and organized by the ranking engine 304 (or alternatively, organized by the media selector 302) to the user in a coherent, up-to-date form for easy comprehension. Further, the news has been processed to minimize redundancy and presented in a narrative form by the media selector 302 or alternatively, by the display engine 306. (In FIG. 4 neither Brittney nor Megan has a special relationship with the user. As discussed herein, if desired, the screen could say, "your sister" for Brittney, or "your best friend" for Megan, for example.)

Four dynamically selected items of media content based on the user's relationships with other users 402 are displayed. In the presentation 400 in FIG. 4, the user's most important relationships are with Megan, Brittney and the group Country Music Listeners. The weighting of user interactions with items of media content associated with these relationships resulted in the item of media reflecting two of these three most important relationships being presented at the top of the display, followed by items of media content (here, news stories) about Megan, then other news stories about Brittney.

As discussed herein, the display engine/GUI 208 may display the presentation 400. Further, as also discussed herein, the user may input selections for various media content preference setting selections associated with one or more relationships associated with items of media content in the social network environment. Accordingly, the user profile database 208 is updated with the user's media content preference setting selections for each relationship. The user interaction analysis and the user profile are utilized by the media selector 302 to create the presentation of personalized, dynamically selected media. The display engine/GUI 306 is then utilized to display the personalized, dynamic news feed to the user, in order to keep the user up to date on relationships, events and objects of interest to the user as indicated by the media content preference setting selections chosen by the user and the analysis selected by the ranking engine 304.

Figure 5:
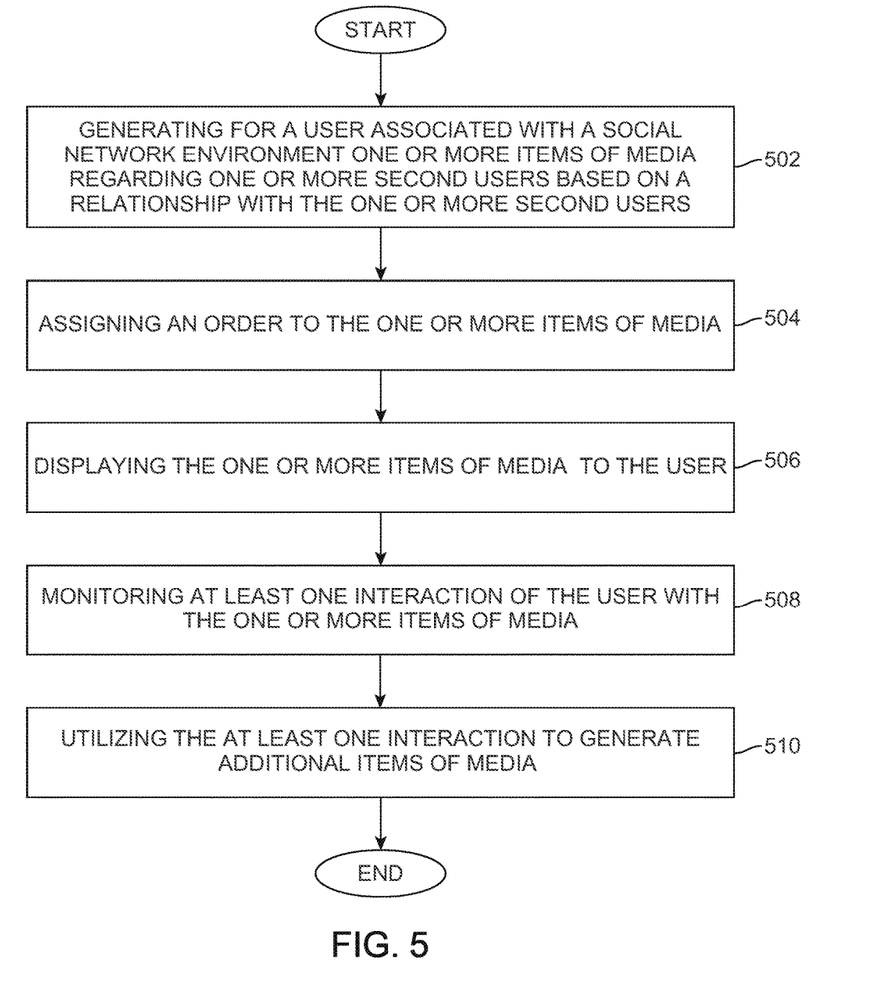
FIG. 5 is a flow chart of an exemplary process for providing dynamically selected media to a user of an electronic device in a social network environment.

FIG. 5 illustrates a flow diagram of an exemplary process for providing dynamically selected media to a user of an electronic device in a social network environment. At step 502 one or more items of media content regarding one or more second users based on a relationship with the one or more second users is selected for a user associated with a social network environment. As discussed herein, the relationship may include relationships with one or more individual users, or relationships with categories of users such as those in a geographical location network, a college network, and so forth. The items of media content may include one or more categories or subcategories, such as photos, event notices, invitations, bulletin board postings, contact information, emails, and so forth.

At step 504, an order is assigned to the one or more items of media content selected for the user. As discussed herein, a user action analysis is generated by tracking user actions and recording the frequencies of those actions with items of media content associated with various relationships, and ranking the various relationships in importance to the user. For example, a user interested in learning about the activities of his favorite group, such as a group of fellow college alumni near a reunion date, may click on items of media content associated with fellow college alumni with high frequency over a few days or weeks. The high-frequency of user action associated with fellow college alumni will result in a rank of high importance to the user for items of media content associated with fellow college alumni. In some embodiments not shown, the user may change the order of the items of media content, for example, via a separate settings display that allows the user to prioritize and/or filter certain items of media content, and/or also by using a "drag-and-drop" function to organize stories dynamically on the media content display.

At step 506 the one or more items of media content are displayed to the user in a consolidated, tailored form based on the order determined by the user interaction analysis. In the example discussed in the preceding paragraph, items of media content associated with fellow college alumni will be presented near the top of the display.

At step 508, at least one interaction of the user with items of media content in the social network environment is monitored. These items of media content may be from those selected by the media selector 302, but may also be any other media content available through the social network provider 106 accessed or viewed by the user. As discussed herein, the monitored frequencies of user interactions with items of media content associated with the user's relationships with other users are provided to the ranking engine to determine the order in which items of media content should be presented to the user.

At step 510, the monitoring of the at least one interaction of the user with items of media content in the social network environment is utilized to select additional items of media content for dynamic presentation to the user. As discussed herein, in some embodiments the ranked items of media content are converted into a news feed display, such as the exemplary presentation 400 illustrated in FIG. 4. The presentation 400 may combine content from the one or more relationships, networks, categories, and/or subcategories into one or more items of media content or categories of items of media.

While various embodiments have been described above, it should be understood that they have been presented by way of example only, and not limitation. For example, any of the elements associated with the dynamically selected media presentation may employ any of the desired functionality set forth hereinabove. Thus, the breadth and scope of a preferred embodiment should not be limited by any of the above-described exemplary embodiments.

Embodiments of this invention may also include a computer readable medium having embodied thereon a program, the program being executable by a processor for performing a method, as described herein, for providing dynamically selected media content to a user of an electronic device in a social network environment

What is claimed is:

1. A computer-implemented method comprising:
   storing in a database a user profile for a viewing user of an online system, the user profile including an identification of a plurality of other users of the online system with whom the viewing user has established a connection;
   monitoring one or more interactions between the viewing user of the online system and the plurality of other users of the online system with whom the viewing user has established a connection;
   determining, from the one or more monitored interactions, a frequency of interactions of the viewing user associated with the plurality of other users with whom the viewing user has established a connection;
   obtaining a plurality of candidate news stories associated with at least one of the plurality of other users with whom the viewing user has established a connection;
   determining, for the viewing user, a weight for media content in each of the plurality of candidate news stories based on the frequency of interactions;

classifying each candidate news story based on whether the candidate news story is of short-term interest to the viewing user or of long-term interest to the viewing user, the classification performed based at least in part on a frequency of interactions of the viewing user with topics associated with the candidate news story;

modifying the weight for the media content in each of the plurality of candidate news stories based on a function of time, wherein a weight for media content included in a candidate news story is modified to decrease over time if the candidate news story is classified as of short-term interest to the viewing user and wherein the weight for the media content included in the candidate news story remains steadily high if the candidate news story is classified as of long-term interest to the viewing user;

selecting, from the plurality of candidate news stories, one or more news stories for the viewing user based at least in part on the modified weight for the media content in each of the plurality of candidate news stories; and sending the selected one or more news stories to the user device for display in a newsfeed to the viewing user.

2. The method of claim 1, further comprising:

sending the newsfeed comprising a plurality of news stories associated with actions of a plurality of users of the online system selected from news stories based on the modified weight for the media content in the plurality of news stories to the user device for display to the viewing user; and updating the newsfeed on the user device with the selected one or more news stories.

3. The method of claim 1, wherein monitoring one or more interactions comprises:

recording interactions of the viewing user actions associated with particular relationships, events, objects, categories of relationships, subcategories of relationships, categories of events, categories of objects, subcategories of events or subcategories of objects.

4. The method of claim 1, wherein the determined weight for a selected news story is based in part on a frequency with which the viewing user interacts with a user of the social network system taking an action described in the selected news story.

5. The method of claim 1, wherein at least one of the monitored one or more interactions is with one or more items of media content contained in a news story selected for the viewing user.

6. The method of claim 1, further comprising:

retrieving relationship data for the plurality of other users of the online system with whom the viewing user has established a connection, the relationship data identifying relationships of one or more users with other users of the social networking system, the one or more news stories for the viewing user further being selected based on one or more preference settings of the viewing user identifying a relationship type of a plurality of relationship types between the viewing user and one or more other users of the online system.

7. The method of claim 6, wherein a preference setting excludes selection of news stories associated with a relationship type between the viewing user and one or more other users of the plurality of other users with whom the viewing user has established a connection.

8. A computer-implemented method comprising:

monitoring one or more interactions between a viewing user of an online system and a plurality of other users of the online system with whom the viewing user has established a connection with through the online system;

determining, from the one or more monitored interactions, a frequency of interactions of the viewing user with the plurality of other users of the online system;

retrieving a plurality of candidate news stories associated with at least one of the plurality of other users with whom the viewing user has established a connection with through the online system;

determining, for the viewing user, a weight associated with media content in at least one of the plurality of candidate news stories based on the frequency of interactions;

classifying each candidate news story based on whether the candidate news story is of short-term interest to the viewing user or of long-term interest to the viewing user, the classification performed based at least in part on a frequency of interactions of the viewing user with topics associated with the candidate news story;

modifying the weight for the media content in each of the plurality of candidate news stories based on a function of time, wherein a weight for media content included in a candidate news story is modified to decrease over time if the candidate news story is classified as of short-term interest to the viewing user and wherein the weight for the media content included in the candidate news story remains steadily high if the candidate news story is classified as of long-term interest to the viewing user;

selecting, from the plurality of candidate news stories, one or more news stories for the viewing user based at least in part on the modified weight associated with the media content in each of the plurality of candidate news stories; and sending the selected one or more news stories to the user device for display in a newsfeed to the viewing user.

9. The method of claim 8, wherein the weight associated with the media content from the at least one of the plurality of candidate news stories is based at least in part on the frequency of interactions associated with particular relationships, events, objects, categories of relationships, subcategories of relationships, categories of events, categories of objects, subcategories of events or subcategories of objects.

10. The method of claim 8, wherein selecting the one or more news stories for the viewing user from the plurality of candidate additional news stories further comprises:

ranking the plurality candidate news stories based on the modified weight associated with the media content in each candidate news story; and selecting the one or more news stories from the ranked candidate news stories based at least in part on one or more preference settings.

11. The method of claim 10, wherein the one or more preference settings identify a relationship type of a plurality of relationship types between the viewing user and one or more other users of the online system.

12. The method of claim 8, further comprising:

sending the newsfeed comprising a plurality of news stories associated with actions of a plurality of users of the online system selected from news stories based on the modified weight for the media content in the plurality of news stories to the user device for display to the viewing user; and updating the newsfeed on the user device with the selected one or more news stories.

13. The method of claim 8, wherein the online system maintains a user profile for the viewing user that includes an identification of the plurality of other users of the online system with whom the viewing user has established a connection, and wherein at least one of the one or more news stories includes a description of an action taken by at least one of the other users of the online system with whom the viewing user has established a connection.

14. The method of claim 8, further comprising:
retrieving relationship data for the plurality of other users of the online system with whom the viewing user has established a connection, the relationship data identifying relationships of one or more users with other users of the social networking system, the one or more news stories for the viewing user further being selected based on one or more preference settings of the viewing user identifying a relationship type of a plurality of relationship types between the viewing user and one or more other users of the online system.

15. The method of claim 14, wherein a preference setting excludes selection of news stories associated with a relationship type between the viewing user and one or more other users of the plurality of other users with whom the viewing user has established a connection.

16. A computer-implemented method comprising:
monitoring one or more interactions between a viewing user of an online system and a plurality of other users of the online system with whom the viewing user has established a connection with through the online system;
determining, from the one or more monitored interactions, a frequency of interactions of the viewing user with the plurality of other users of the online system;
retrieving a plurality of candidate news stories associated with at least one of the plurality of other users with whom the viewing user has established a connection with through the online system;
determining, for the viewing user, a weight associated with media content in at least one of the plurality of candidate news stories based on the frequency of interactions;
classifying each candidate news story based on whether the candidate news story is of short-term interest to the viewing user or of long-term interest to the viewing user, the classification performed based at least in part on a frequency of interactions of the viewing user with topics associated with the candidate news story;
modifying the weight for the media content in each of the plurality of candidate news stories based on a function of time, wherein a weight for media content included in a candidate news story is modified to decrease over time if the candidate news story is classified as of short-term interest to the viewing user and wherein the weight for the media content included in the candidate news story remains steadily high if the candidate news story is classified as of long-term interest to the viewing user;
selecting, from the plurality of candidate news stories, one or more news stories for the viewing user based at least in part on the modified weight associated with the media content in each of the plurality of candidate news stories; and
sending the selected one or more news stories to the user device for display in a newsfeed to the viewing user, at least one of the one or more news stories including a description of an action taken by at least one of the other users of the online system with whom the viewing user has established a connection.

17. The method of claim 16, further comprising:
sending the newsfeed comprising a plurality of news stories associated with actions of a plurality of users of the online system selected from news stories based on the modified weight for the media content in the plurality of news stories to the user device for display to the viewing user; and
updating the newsfeed on the user device with the selected one or more news stories.

18. The method of claim 16, wherein monitoring one or more interactions comprises recording interactions of the viewing user actions associated with particular relationships, events, objects, categories of relationships, subcategories of relationships, categories of events, categories of objects, subcategories of events or subcategories of objects.

19. The method of claim 16, wherein a monitored interaction of the one or more monitored interactions is with one or more items of media content contained in a news story displayed to the viewing user.

20. The method of claim 16, wherein the weight associated with the media content from the at least one of the plurality of candidate news stories is based at least in part on the frequency of interactions associated with particular relationships, events, objects, categories of relationships, subcategories of relationships, categories of events, categories of objects, subcategories of events or subcategories of objects.

\* \* \* \* \*